Jan. 4, 1966 P. C. DIMITRACOPOULOS ET AL 3,227,458

SIGNAL RECORDER WITH HYDRAULIC FEED

Filed March 7, 1962

INVENTORS:
P. C. DIMITRACOPOULOS
C. D. PEZARIS

BY Homer R. Montague
ATTORNEY

United States Patent Office 3,227,458
Patented Jan. 4, 1966

3,227,458
SIGNAL RECORDER WITH HYDRAULIC FEED

Panayotis Constantine Dimitracopoulos and Constantine Demetrius Pezaris, Montreal, Quebec, Canada, assignors to The A.V. Corporation N.V., Curacao, Netherlands Antilles, a corporation of the Netherlands Antilles

Filed Mar. 7, 1962, Ser. No. 178,183
15 Claims. (Cl. 274—9)

This invention has to do with signal recording, for example sound wave or signal impulse recording, and provides a simple, compact, low cost and efficient spiral or helical track recorder of extremely good recording quality in which the entire drive power for moving the recording transducer is supplied by a spring under hydraulic or dashpot control.

The device of the invention is especially useful in producing spiral sound tracks upon audiovisual slides of the type described in our copending application filed in the United States on July 3, 1961, entitled "Audiovisual Projection System," Serial No. 121,734, now U.S. Patent No. 3,122,054. However, the invention is equally applicable to spiral or helical track sound or signal recording generally, as will appear below.

As is well known in the art of spiral track sound and impulse recording, a principal problem is that of obtaining a smooth and even motion between the record medium and the recording transducer. The recording medium is usually placed on a rotating turntable (in the case of flat disc records) or on a rotating drum or drums (in the case of cylindrical or belt records). The inertia of the turntable or drums helps to maintain the smooth and even motion of the record with respect to the direction of the sound track itself, but with regard to the transverse motion, the usually light recording transducer and its carriage must also be moved very smoothly across or transverse to the record track travel direction. The small mass of these parts, and the low speed with which they must move, represents a very small inertia or momentum, which cannot alone contribute effectively to the equally important smoothness of the lateral movement. The effects of irregularities in this transverse motion are not due principally to resulting inaccuracies in the spacing of the successive grooves or turns of the track, but rather to the setting up of minute vibrations in the transducer and stylus which have components that react unfavorably on the quality of the recording.

It has usually been proposed to drive the transducer from the turntable motor, or even separately, through complex gearings, lead screws, flywheels and the like, which solution involves great size and weight, and may for example involve weights approaching a ton or more where very high quality is required. The present invention solves the problems of size, weight and cost by separating the record drive completely from the transducer motion, and moving the recording transducer by a simple spring arrangement, under the speed-stabilizing influence of a hydraulic bellows or dashpot control.

The record may be a flat disc or plate supported on a turntable which is rotated by an electric motor or other means well known in the art. Alternatively, the record may be of substantially cylindrical form, or of the belt type. By way of illustrative example, we shall describe two preferred types of recorders, both employing our novel transducer-moving technique in combination with a record-supporting turntable, but is to be understood that for the turntable one may substitute a rotating drum or drums, and the flat record may be replaced by a cylinder or belt.

Figures 1, 2:
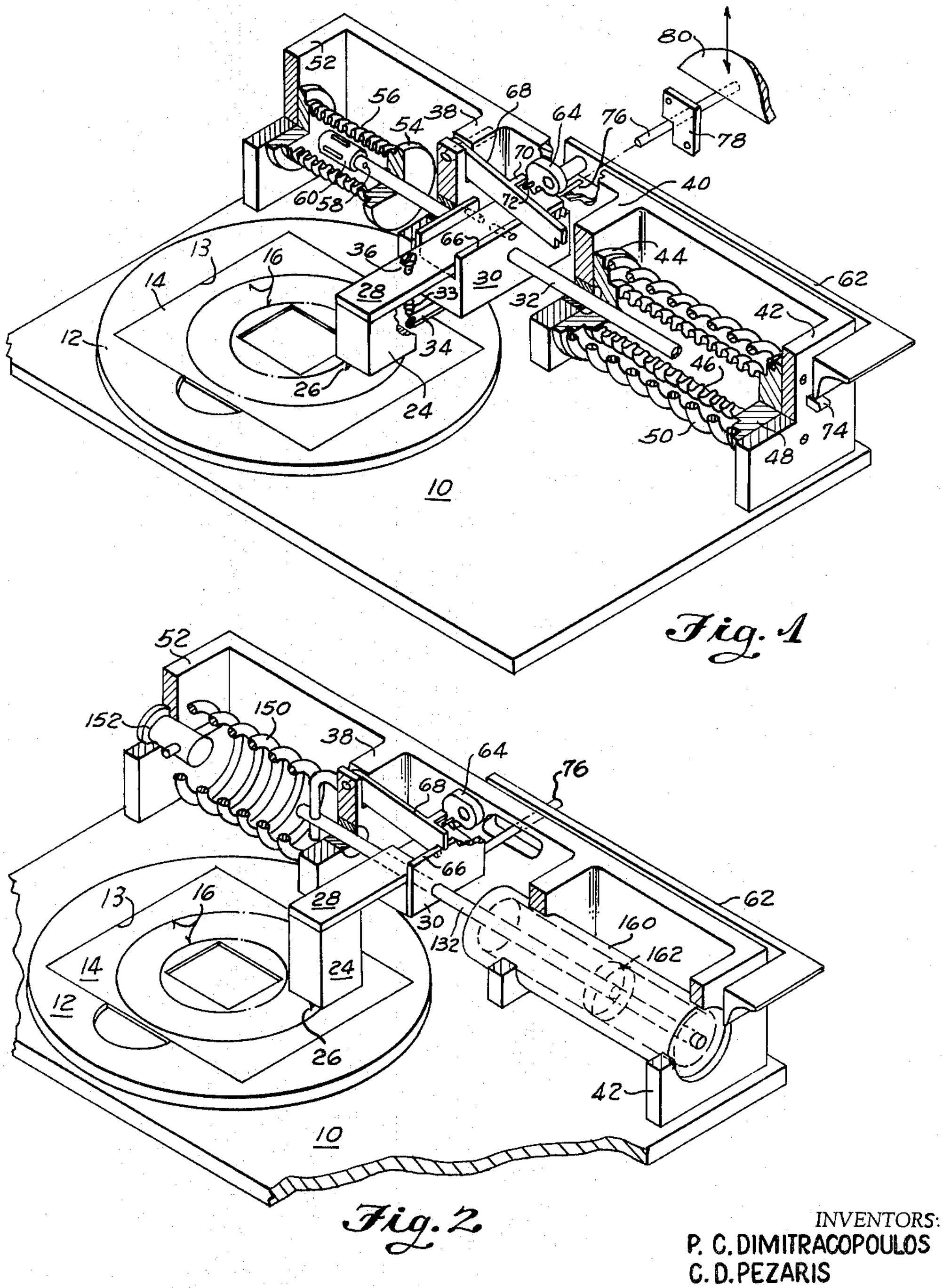
FIGURE 1 is a schematic perspective view, partly broken away, of one form of the invention which employs bellows for the control, the device being shown in the condition it occupies substantially upon completion of a recording.
FIGURE 2 is a similar view of a modified form employing a piston and cylinder dashpot, the device being shown in the condition it occupies substantially just prior to the commencement of a recording.

Certain components necessary to complete a commercial device, such as the turntable drive motor, signal input means, a housing and so on, are omitted for the sake of clarity. These can be chosen from known or convenient designs familiar to those skilled in the art.

In FIGURE 1 of the drawings, numeral 10 designates a main base plate above which is mounted for rotation a turntable 12 adapted to support and rotate a record blank 14 which is to receive a spiral sound track in the region indicated by 16. Where the blank is rectangular or square, as shown, a pocket or recess 13 in the turntable serves to locate the record blank in a centered position and to ensure a positive rotational drive thereof. The blank 14 may be of any appropriate material and construction, and especially of an audiovisual type as described in the application mentioned above. The table 12 may be driven by a motor or the like (not shown).

The recording head or transducer is shown at 24 with the usual stylus 26 (in the case of a mechanical groove recording), mounted upon an arm 28 pivoted for limited vertical swinging motion upon a carriage 30 which is firmly mounted upon a reciprocable drive shaft 32. As shown, arm 28 is pivoted upon upstanding flanges of the carriage, and a tension spring 33 connects the arm to a lug 34 on the carriage to urge the stylus 26 with the proper recording pressure against the blank 14. An adjusting screw for the tension spring is indicated at 36.

Secured to base plate 10 is a fixed support structure of upstanding walls including an inner pair of walls 38, 40 which include aligned bearings through which shaft 32 can reciprocate in moving the carriage 30. Between wall 40 and the right-hand wall 42 shaft 32 has secured thereto a flanged disc 44 connected by a metal flexible bellows 46 to a similar flanged disc 48 secured on wall 42. A compression spring 50 extends between the flanged discs and about the bellows, thus urging disc 44 and shaft 32 to the position shown.

The portion of shaft 32 which extends into the space between wall 38 and the left-hand end wall 52 has secured thereto a flanged disc 54, connected by another bellows 56 to a similar disc secured to wall 52. Shaft 32 is hollow, and within bellows 56 it has a small radial bleed hole 58 to control the escape of hydraulic fluid from bellows 56 into shaft 32, and hence into the opposite bellows 46, as shaft 32 and carriage 30 move to the left under the pressure of spring 50. To permit rapid and unimpeded motion of the shaft 32 when spring 50 is being recompressed, a check valve 60 at the end of shaft 32 in bellows 56 allows free escape of fluid from the shaft into that bellows.

To rewind spring 50 in preparation for making a recording, and to move the carriage 30 so that the stylus will be at the outer radius of the sound track region 16, a long lever arm 62 is pivoted in the rear wall between walls 38 and 40, and its pivot shaft carries, on the opposite (forward) face of the rear wall, a cam 64 whose nose is positioned to engage the flange 66 of carriage 30 and urge the carriage to the right, compressing spring 50. However, during the initial part of the upward motion of arm 62, a peripheral cam surface of cam 64 first engages the tail of transducer arm 28 rearwardly of its pivot axis, lifting the transducer or recording head 24 and stylus 26 away from the record surface. Further motion of arm 62 into substantially its upright position compresses spring 50, and at the end of this motion a latch lever 68 drops behind flange 66 and latches the carriage 30 in its cocked position.

Latch 68 may be pivoted in wall 38, and has a lateral lug 70 which will be engaged by a pin 72 on cam 64 when arm 62 is returned from its upright position (at the end of the winding motion) fully back to the horizontal position shown in the drawings. If desired, a resilient resistance or cushion element 74 may be positioned anywhere in the downward path of arm 62 to serve as an end stop for the arm, so that the latch will not be released until arm 62 is given a slight extra downward push some time after the carriage has been latched. The arm will thus serve as a trigger, transducer 24 being in its raised position to facilitate loading and unloading of the turntable.

In operation, with a fresh record blank on the turntable, arm 62 is depressed enough for pin 72 to lift latch 68, and carriage 30 moves to the left, stylus 26 engaging the record blank to record signals applied to transducer 24 over the usual recording circuit, amplifier or the like. As bellows 56 is thus compressed, fluid passing through orifice 58 at a controlled and gradual rate passes through shaft 32 and into bellows 46, these parts constituting a completely sealed hydraulic system. The motion is extremely smooth and regular, and free from any perturbations due to gears or connections with the turntable drive. Also, the carriage drive does not impose any load upon the table drive itself, which might produce slight fluctuations in table speed.

After completion of a recording, arm 62 is merely lifted up to cam the forward end of transducer arm 28 upward away from the record, and to compress the carriage spring until it is latched by latch 68, after which arm 62 can be restored to the position shown in preparation for the next recording. During the spring-compressing motion, fluid passes freely from bellows 46 to bellows 56 via check valve 60, so that the compressing movement is not significantly impeded.

The dashpot or hydraulic action can best be understood from the following. The principal factors influencing the rate of traverse of the carriage and its transducer in the foregoing arrangement are the strength of the spring 50, the viscosity of the hydraulic fluid, and the dimensions of the bleed hole 58; other factors such as mechanical friction, the hydraulic friction or resistance in the bore of tube 32, and the nature of the stylus and the recording medium and the stylus pressure also affect the traverse time, but these factors may be made completely negligible. For a given radial width of the sound track, which amounts to a given total recording time, the traverse time can be satisfied by various combinations of the three principal factors just stated. It is pointed out that while a light spring pressure combined with a low fluid viscosity might yield a correct recording or traverse time, it will ordinarily be preferable to choose a rather high spring pressure, and a higher value of fluid viscosity. This ensures that slight changes in the friction along the path of the rod or shaft 32 will have a minimal effect on the constancy of the radial speed of the transducer, as will any other potentially variable resistance factors. In a typical design for a travel distance of about a half inch, a spring pressure of 17 pounds was used, and a fluid having a viscosity of about 100 centistokes, with an appropriate size of bleed hole in a shaft 32 of ¼ inch outside diameter. The high spring pressure is no impediment to easy rewinding in view of the long cocking lever arm 62.

As a convenient but not essential feature of the arrangement, the tail of arm 28 in FIGURE 1 may have a pin 76 which extends through a slot in the rear wall of the main support between walls 38 and 40, and cooperates with a ledge provided as by a shaped plate 78 secured to the rear surface of that rear wall, the ledge being so positioned as to hold the pin 76 down, and hence the transducer 24 and stylus 26 up, and away from the record blank, when the carriage 30 has been moved to its fully compressed position. When a new recording is commenced, the pin will slide off of the ledge after a short travel of the carriage, bringing the stylus into contact with the blank.

If desired, the same pin 76 may extend far enough beyond the plate 78 so that, when a top cover for the apparatus is applied, as at 80, the stylus will be lifted and held out of contact with the record regardless of the position of carriage 30; this will aid in preventing damage to the record blank and stylus during transport of the equipment.

FIGURE 2 of the drawings shows a modified version of the recorder based on the same principles, but in this figure the parts are shown in the latched-carriage condition as they would be just prior to the commencement of a recording. The same numerals have been used for parts which may be identical to those described above. In this form, the transducer arm 28 is affixed to carriage 30, which is held in a normal position (with the stylus in engagement with the record blank) by the rotary position of a helical tension power spring 150, one of whose ends is secured to an adjustable fitting 152 in an end wall 52. The other end of the spring is secured to an end of the shaft 132, which in this case need not be hollow, but is again mounted for sliding in a bearing in the intermediate wall 38. The carriage 30 has again a flange as at 66, which can be latched by the lever 68. A pin to release the latch is also shown, the pin being again carried by a cam 64 whose nose will urge the carriage to the right, to tension the spring, when arm 62 is raised as before.

The right end of shaft 132 passes into a dashpot cylinder 160 and may have its near extremity journaled in the end plate thereof. Intermediate its length, a position 162, which will usually include a bleed hole and a larger orifice check valve, is secured to the shaft in the usual manner of a one-way dashpot. There is, of course, an end plate at each end of the cylinder, and the fluid recirculates from one side to the other of the piston 162 as the shaft reciprocates. The operation is essentially as already described, except that the stylus pressure is provided by the same spring that furnishes the traverse drive. As before, at the start of the spring tensioning motion, cam 64 lifts the stylus away from the record (in this case by directly tipping carriage 30), and a tail pin 76 on the carriage may again hold the stylus out of engagement with the record until a few seconds after the start of the traverse motion initiated by the release of latch 68. In other respects, the operation is as described above.

The dashpot arrangements disclosed above have a further advantage in that, where desired, relatively high-pitch lead-in or lead-out grooves may be provided by very simple modifications. For example, the dashpot may be provided, in a manner known per se, with artificially augmented leakage rates at both of the extremities of travel; as by means of by-pass grooves or channels in the cylinders, or like expedients. In the bellows modification shown in FIGURE 1, auxiliary valves associated with shaft 32 can be used for the same purposes.

While the invention has been disclosed herein in connection with presently preferred embodiments, various modifications of the particular mechanisms disclosed can be devised, as will be apparent to those skilled in this art, without departing from the spirit of the invention. Thus, the invention applies equally well to the making of magnetic recordings on discs, cylinders or belts, so long as the carriage-motion problem is present. The direction of the spring action can be reversed if desired to provide "inside-out" recordings, and appropriate condition or warning signals for the guidance of the user can be controlled mechanically or electrically by the position changes of shaft 32 or arm 62, and so on. It is not intended to limit the invention to the specific details as shown, except as may be required by the scope of the appended claims.

What is claimed is:

1. A signal recorder including (a) a travelling carriage and a recording transducer carried by said carriage and arranged to be selectively elevated away from a sound recording medium, (b) spring means for urging said carriage normally in one direction of travel lateral to the direction of a record trace, (c) hydraulic control means for regulating the speed of travel of said carriage in said one direction, (d) a latch engageable with said carriage to latch it in a position in which said spring means is in its relatively more tensioned condition, and (e) a cam including formations for elevating said transducer and thereafter moving said carriage to said position during movement of said cam in one direction, and a formation for releasing said latch upon completion of movement of said cam in the opposite direction.

2. A signal recorder including (a) a travelling carriage and a recording transducer carried by said carriage, (b) spring means for urging said carriage normally in one direction of travel lateral to the direction of a record trace, (c) hydraulic control means for regulating the speed of travel of said carriage in said one direction, (d) means engageable with said carriage to hold it in a position in which said spring means is in its relatively more tensioned condition, and (e) a cam including a formation for moving said carriage to said position during movement of said cam in one direction, and a formation for releasing said holding means upon movement of said cam in the opposite direction.

3. A signal recorder in accordance with claim 2, in which said hydraulic means includes a fluid-containing bellows having one end connected with said carriage.

4. A signal recorder in accordance with claim 3, in which said hydraulic means also includes an auxiliary bellows connected to receive fluid displacement from the first-named bellows.

5. A signal recorder in accordance with claim 3, including a check valve in the connection for fluid flow between said two bellows.

6. A signal recorder in accordance with claim 3, in which the connection between said bellows and said carriage is constituted by a shaft forming a slide bearing element for the movement of said carriage.

7. A signal recorder in accordance with claim 6 in which said shaft is a hollow shaft in fluid communication with said bellows, and also in fluid communication with a fluid reservoir.

8. A signal recorder in accordance with claim 3 in which said hydraulic control means includes a bellows, and in which said spring means includes a spiral spring surrounding said bellows.

9. A signal recorder including a recording transducer supported on a carriage, said carriage mounted on a shaft, the shaft being slidably supported by bearing means for reciprocation along its longitudinal axis, spring means for moving the shaft along its axis, the direction of motion being along a path relative to a moving recording medium, and hydraulic means for regulating the speed of travel of the shaft.

10. A sound recorder comprising a turnable adapted to support a record blank for rotation therewith, a carriage mounted above said turntable for reciprocation along a radial direction relative to said turntable, a recording transducer carried by said carriage for cooperation with such a record blank, a spring connected to said carriage to urge the same along a radial path relative to said turntable, dashpot means connected to said carriage to oppose by fluid friction the driving force of said spring and thereby to control the motion of said carriage, means for restoring said carriage to an initial position along said path and simultaneously re-winding said spring, and means responsive to completion of the operation of said restoring means for latching said carriage in its spring-wound condition.

11. A sound recorder comprising a turntable adapted to support a record blank for rotation therewith, a carriage mounted on a shaft above said turntable for reciprocation along a path substantially parallel to the longitudinal axis of said shaft, a recording transducer carried by said carriage for cooperation with such a record blank, a spring connected to said shaft to urge same along its longitudinal axis and thereby moving said transducer along a radial path relative to said turntable, hydraulic means connected to said shaft to oppose by fluid friction the driving force of said spring and thereby to control the motion of said carriage, and means for restoring said carriage to an initial position along said path and simultaneously re-winding said spring.

12. A sound recorder in accordance with claim 11, including means operated by said restoring means during a period immediately preceding the commencement of its restoring motion, for lifting said transducer out of contact with the record blank.

13. A sound recorder in accordance with claim 10, including means operable by motion of said restoring means beyond its spring-wound condition, for releasing said latching means to initiate a subsequent recording operation.

14. A sound recorder in accordance with claim 11, in which said carriage is rotatable about the axis of said spring to control the position of said transducer relative to the record blank, in the direction perpendicular to the latter.

15. A sound recorder in accordance with claim 14, in which said spring is arranged to establish a rest orientation of said carriage and thereby of said transducer relative to the record blank.

References Cited by the Examiner

UNITED STATES PATENTS

| | | | |
|---|---|---|---|
| 2,066,859 | 1/1937 | Schiler | 274—14 |
| 2,263,979 | 11/1941 | Bruno | 274—23 |
| 2,922,655 | 1/1960 | Brasseur | 274—1 |

LOUIS J. CAPOZI, *Primary Examiner.*

ANTONIA F. GUIDA, *Examiner.*